(12) United States Patent
Kang et al.

(10) Patent No.: US 11,895,401 B2
(45) Date of Patent: Feb. 6, 2024

(54) CAMERA MODULE FOR HIGH RESOLUTION AUTO FOCUSING AND ELECTRONIC DEVICE INCLUDING SAME

(71) Applicant: Samsung Electronics Co., Ltd., Gyeonggi-do (KR)

(72) Inventors: Hwayong Kang, Gyeonggi-do (KR); Dongsoo Kim, Gyeonggi-do (KR); Jaehyoung Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/861,788

(22) Filed: Jul. 11, 2022

(65) Prior Publication Data

US 2022/0345634 A1 Oct. 27, 2022

Related U.S. Application Data

(63) Continuation of application No. PCT/KR2021/017007, filed on Nov. 18, 2021.

(30) Foreign Application Priority Data

Nov. 18, 2020 (KR) .................. 10-2020-0154925

(51) Int. Cl.
*H04N 23/67* (2023.01)
*G02B 3/00* (2006.01)
(Continued)

(52) U.S. Cl.
CPC ......... *H04N 23/672* (2023.01); *G02B 3/0056* (2013.01); *G02B 5/201* (2013.01); *G02B 7/28* (2013.01); *H04N 25/135* (2023.01)

(58) Field of Classification Search
CPC .... H04N 23/672; H04N 25/135; H04N 23/12; H04N 25/134; H04N 25/136;
(Continued)

(56) References Cited

U.S. PATENT DOCUMENTS 8,102,460 B2 1/2012 Awazu
9,807,294 B2 10/2017 Liu et al.
(Continued)

FOREIGN PATENT DOCUMENTS

JP 2007006038 1/2007
JP 2010-252277 11/2010
(Continued)

OTHER PUBLICATIONS

PCT/ISA/210 Search Report issued on PCT/KR2021/017007, dated Mar. 21, 2022, pp. 5.
(Continued)

*Primary Examiner* — Gevell V Selby
(74) *Attorney, Agent, or Firm* — The Farrell Law Firm, P.C.

(57) ABSTRACT

Disclosed is an electronic device including a camera module, and at least one processor, wherein the camera module includes a micro-lens array, a color filter array, and a light-receiving element array, wherein a first row of the micro-lens array includes a first micro-lens and a second micro-lens adjacent to the first micro-lens, wherein a first row of the color filter array includes a first color filter and a second color filter disposed under the first micro-lens, and a third color filter and a fourth color filter disposed under the second micro-lens, and wherein a first row of the light-receiving element array includes a first light-receiving element disposed under the first color filter, a second light-receiving element disposed under the second color filter, a third light-receiving element disposed under the third color filter, and a fourth light-receiving element disposed under the fourth color filter.

19 Claims, 7 Drawing Sheets

(51) Int. Cl.
*G02B 5/20* (2006.01)
*G02B 7/28* (2021.01)
*H04N 25/13* (2023.01)

(58) Field of Classification Search
CPC ...... H04N 25/133; H04N 25/11; H04N 23/60;
H04N 23/00; H04N 25/704; H04N 23/55;
H04N 23/57; G02B 3/0056; G02B 5/201;
G02B 7/28
See application file for complete search history.

(56) References Cited

U.S. PATENT DOCUMENTS

| | | |
|---|---|---|
| 10,211,245 B2 | 2/2019 | Kim et al. |
| 10,284,799 B2 | 5/2019 | Yokogawa et al. |
| 10,446,599 B2 | 10/2019 | Cho |
| 11,146,720 B2 | 10/2021 | Kim et al. |
| 2012/0033120 A1 | 2/2012 | Nakamura et al. |
| 2015/0015768 A1 | 1/2015 | Tanaka |
| 2015/0070548 A1 | 3/2015 | Fukuda et al. |
| 2015/0304582 A1 | 10/2015 | Hirota |
| 2015/0323760 A1 | 11/2015 | Tomosada |
| 2015/0334375 A1 | 11/2015 | Tokuhashi |
| 2017/0026622 A1 | 1/2017 | Yoon et al. |
| 2017/0094210 A1 | 3/2017 | Galor Gluskin |
| 2018/0006077 A1 | 1/2018 | Lee |
| 2018/0026065 A1 | 1/2018 | Hsieh et al. |
| 2019/0068930 A1* | 2/2019 | Kato ................. G05D 1/0246 |
| 2019/0281226 A1* | 9/2019 | Wang ................. H04N 23/672 |
| 2019/0297291 A1 | 9/2019 | Kim et al. |
| 2020/0236312 A1 | 7/2020 | Murata |
| 2020/0260055 A1 | 8/2020 | Choi |
| 2020/0280659 A1 | 9/2020 | Galor Gluskin |
| 2021/0193728 A1* | 6/2021 | Kim .................. H04N 25/704 |
| 2021/0352258 A1* | 11/2021 | Yamazaki ......... H01L 27/14627 |

FOREIGN PATENT DOCUMENTS

| | | |
|---|---|---|
| JP | 2013145292 | 7/2013 |
| JP | WO 2013/108656 | 7/2013 |
| JP | 2016006969 | 1/2016 |
| JP | 2018014476 | 1/2018 |
| KR | 10-2017-0011818 | 2/2017 |
| KR | 10-2018-0059478 | 6/2018 |
| KR | 10-2019-0110180 | 9/2019 |
| WO | WO 2022/0230675 | 11/2020 |

OTHER PUBLICATIONS

PCT/ISA/237 Written Opinion issued on PCT/KR2020/017007, dated Mar. 21, 2022, pp. 4.
European Search Report dated Dec. 7, 2023 issued in counterpart application No. 21895133.3-1208, 12 pages.

* cited by examiner

CAMERA MODULE FOR HIGH RESOLUTION AUTO FOCUSING AND ELECTRONIC DEVICE INCLUDING SAME

PRIORITY

This application is a Bypass Continuation application of International Application No. PCT/KR2021/017007, which was filed on Nov. 18, 2021, and is based on and claims priority under 35 U.S.C. § 119 to Korean Patent Application No. 10-2020-0154925, which was filed in the Korean Intellectual Property Office on Nov. 18, 2020, the entire disclosure of each of which is incorporated herein by reference.

BACKGROUND

1. Field

The disclosure relates generally to an electronic device, and more particularly, to a camera module capable of implementing all-pixel auto-focusing (AF) with high resolution and an electronic device including the same.

2. Description of Related Art

A camera module of an electronic device may include an image sensor, and the image sensor may perform functions such as AF and auto-exposure (AE) in addition to an image-capturing function.

As to AF, the prior art teaches the use of a phase detection auto focus (PDAF) for fast time focusing. There also exists a method in which micro-lenses are integrated into one lens and are disposed above some pixels. In this case, since optical paths can be distinguished, a focus position can be found by generating a phase difference in a non-focused state and calculating the phase difference.

The prior art further teaches that a structure obtained by embedding a plurality of photoelectric conversion elements, such as photodiodes, in one on-chip lens, is applied to phase difference pixels, the on-chip lens is arranged over pixel groups which are adjacent to two pixels of a row direction on left and right sides, and pixels adjacent to each other on left and right sides have the same color and exposure time.

The prior art teaches that when high resolution is possible, phase difference AF is not possible or a case in which, when phase difference AF is possible, high resolution is not possible to implement due to a reduction in resolution.

Since there is a limitation in the prior art regarding increasing pixels from the viewpoint of the implementation of AF, there are problems in that low-illumination focus performance is deteriorated, an image processing amount is increased, and image quality is degraded.

Moreover, it is difficult in the prior art to improve AF performance and to implement high resolution even with the structure in which micro-lenses are integrated and disposed on some pixels.

Therefore, there is a need in the art to provide a camera module that implements high resolution using a small pixel size and provides phase difference AF, and an electronic device including the camera module.

SUMMARY

The disclosure has been made to address at least the above-mentioned problems and/or disadvantages and to provide at least the advantages described below.

Accordingly, an aspect of the disclosure is to provide a camera module of an electronic device including small-sized pixels to implement high pixels for both phase difference AF and image acquisition.

Another aspect of the disclosure is to provide an electronic device that can simultaneously implement high resolution and phase difference AF while minimizing memory usage by simultaneously acquiring high resolution and phase difference information with only a simple arithmetic operation.

In accordance with an aspect of the disclosure, an electronic device may include a camera module, and at least one processor electrically connected to the camera module, wherein the camera module includes a micro-lens array including a plurality of micro-lenses, a color filter array disposed under the micro-lens and including a plurality of color filters, and a light-receiving element array disposed under the color filter array and including a plurality of light-receiving elements, wherein a first row of the micro-lens array includes a first micro-lens and a second micro-lens adjacent to the first micro-lens, wherein a first row of the color filter array corresponding to the first row of the micro-lens array includes a first color filter and a second color filter disposed under the first micro-lens, and a third color filter and a fourth color filter disposed under the second micro-lens, and wherein a first row of the light-receiving element array corresponding to the first row of the color filter array includes a first light-receiving element disposed under the first color filter, a second light-receiving element disposed under the second color filter, a third light-receiving element disposed under the third color filter, and a fourth light-receiving element disposed under the fourth color filter.

In accordance with another aspect of the disclosure, a camera module includes an image signal processor, a micro-lens array including a plurality of micro-lenses, a color filter array disposed under the micro-lens and including a plurality of color filters, and a light-receiving element array disposed under the color filter array and including a plurality of light-receiving elements, wherein a first row of the micro-lens array includes a first micro-lens and a second micro-lens adjacent to the first micro-lens, wherein a first row of the color filter array corresponding to the first row of the micro-lens array includes a first color filter and a second color filter disposed under the first micro-lens, and a third color filter and a fourth color filter disposed under the second micro-lens, and wherein a first row of the light-receiving element array corresponding to the first row of the color filter array includes a first light-receiving element disposed under the first color filter, a second light-receiving element disposed under the second color filter, a third light-receiving element disposed under the third color filter, and a fourth light-receiving element disposed under the fourth color filter.

In accordance with another aspect of the disclosure, an electronic device includes a camera module, and a processor operatively connected to the camera module, wherein the camera module includes a micro-lens array, a color filter array including a plurality of color filters, wherein each of the plurality of color filters selectively passes a wavelength of incident light, which passes through the micro-lens array, and a light-receiving element array disposed below the color filter array, wherein the micro-lens array is arranged in an N/2×M array, the color filter array is arranged in an N×M array, and the light-receiving element array is arranged in an N×M array.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
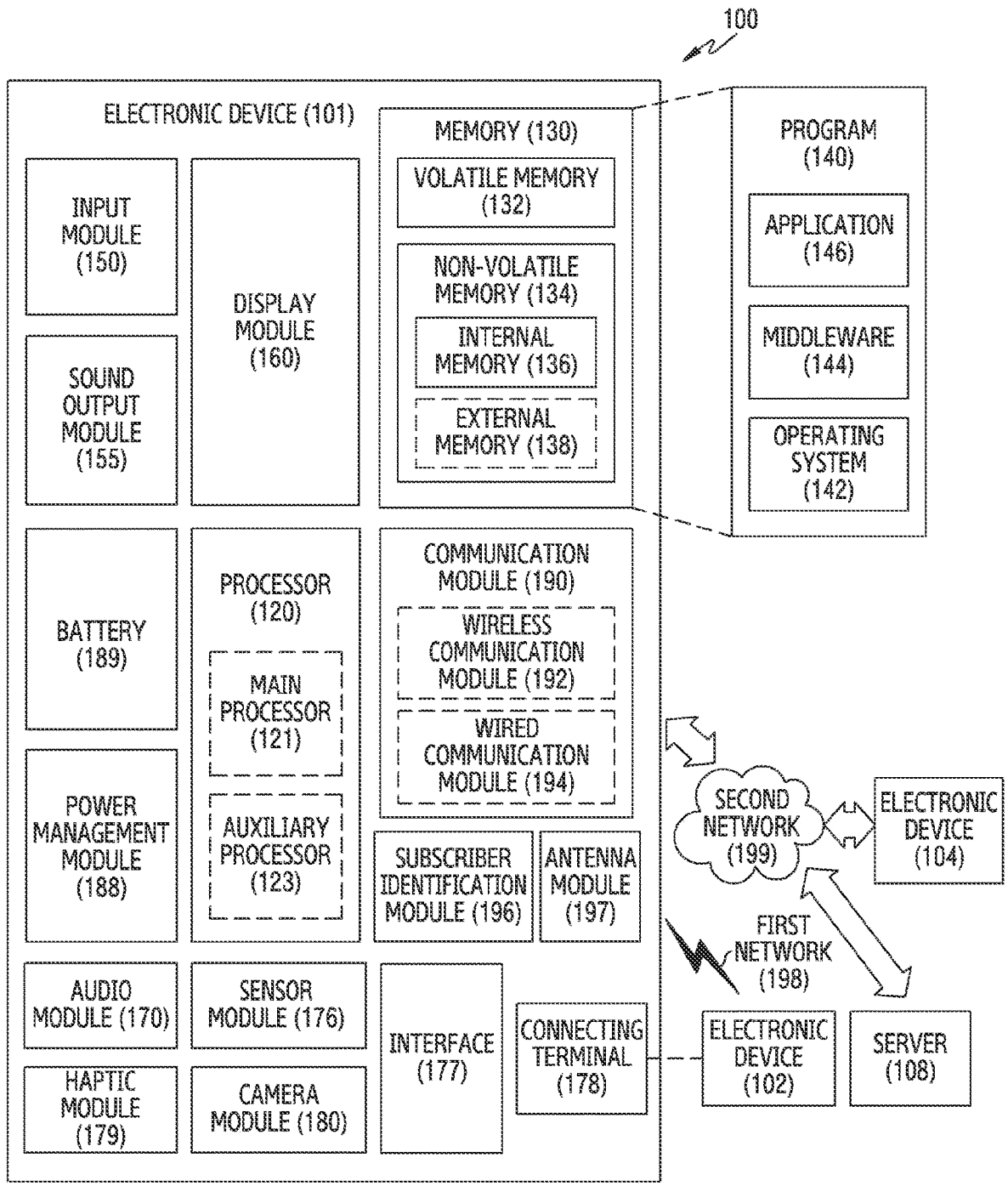
FIG. 1 is a block diagram of an electronic device in a network environment according to an embodiment.

Hereinafter, various embodiments of this document will be described with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
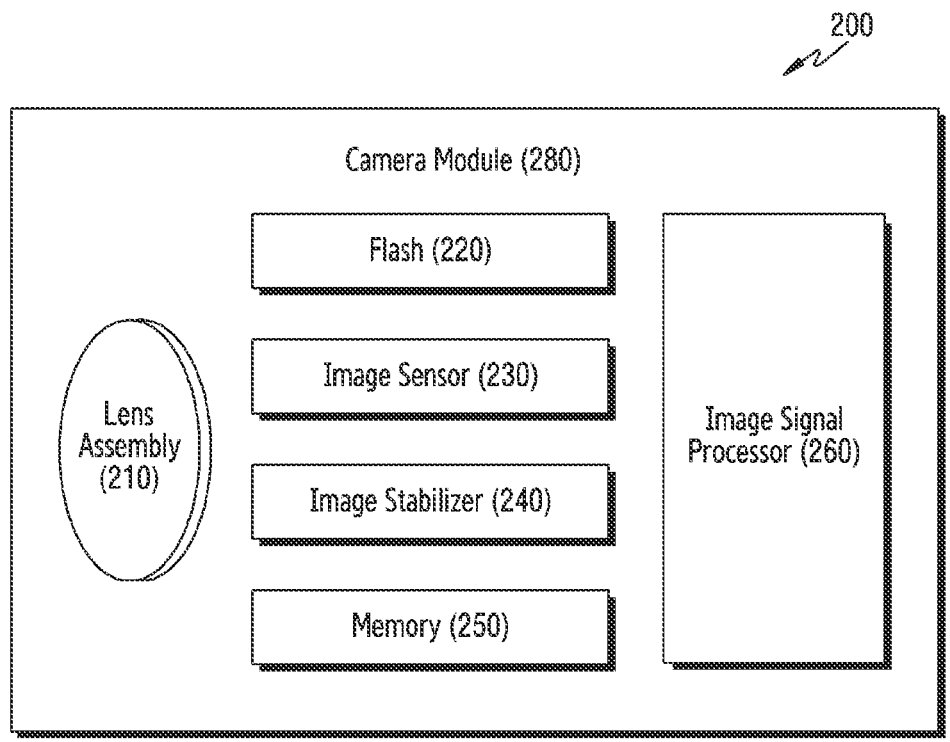
FIG. 2 is a block diagram of a camera module according to an embodiment.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayerpatterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

Figure 3:
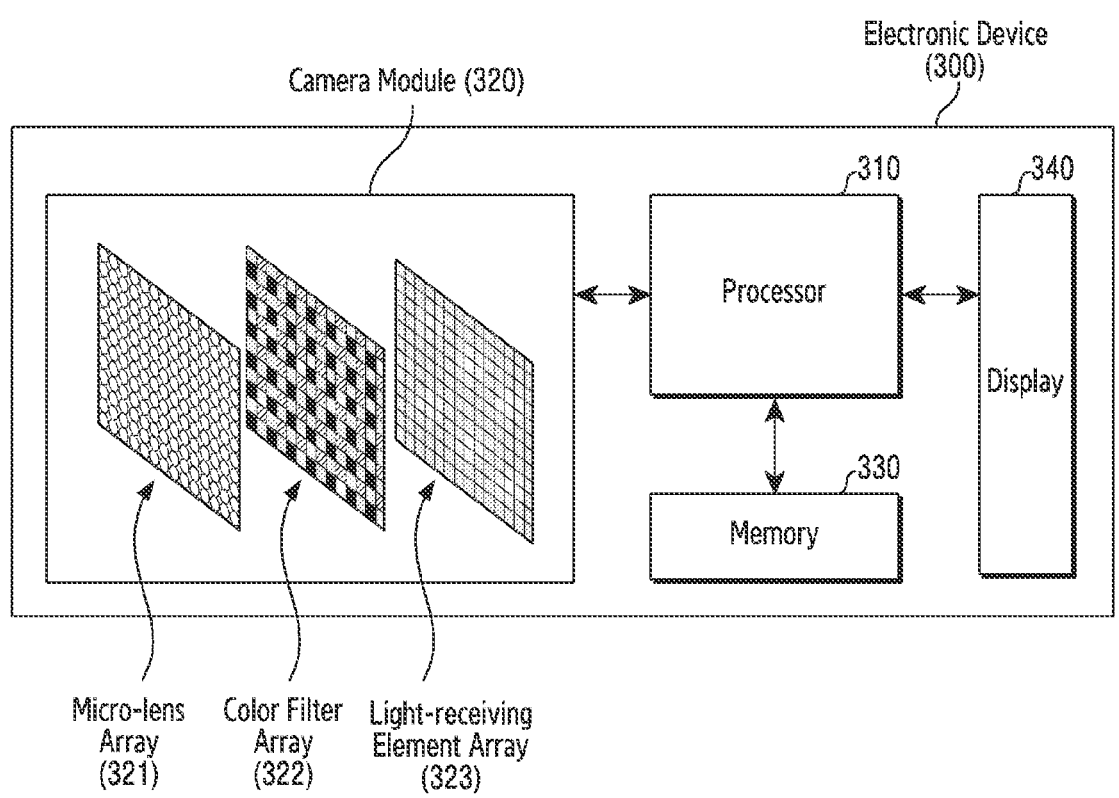
FIG. 3 illustrates an electronic device including a camera module according to an embodiment.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera. In addition, the plurality of camera modules 180 may include at least one of a wide-angle camera, a telephoto camera, a color camera, a monochrome camera, or an IR (infrared) camera, (e.g., TOF (time of flight) camera, structured light camera). According to an embodiment, the IR camera may be operated as at least a part of a sensor module (e.g., the sensor module 176 of FIG. 1). For example, the TOF camera may be operated as at least a part of a sensor module (e.g., the sensor module 176 of FIG. 1) for detecting the distance to the subject. FIG. 3 illustrates an electronic device including a camera module according to an embodiment.

FIG. 3 illustrates components included in an electronic device 300, which may include components that are the same as or similar to those of the electronic device 101 described with reference to FIG. 1.

Referring to FIG. 3, the electronic device 300 may include at least a processor 310, a camera module 320, a memory 330, and a display 340. In addition, the camera module 320 may include components that are the same as or similar to those of the camera module 180 of FIG. 1 or the camera module 180 of FIG. 2.

The processor 310 may be electrically or operatively coupled with the camera module 320, the memory 330, and the display 340. The processor 310 are capable of controlling the camera module 320, the memory 330, and the display 340, and the display 340 by being connected to these components.

The control operation of the processor 310 will be described later in necessary parts.

The camera module 320 may include a micro-lens array 321 in which a plurality of micro-lenses is arranged, a color filter array 322 in which a plurality of color filters are arranged in a Bayer pattern, and a plurality of a light-receiving element array 323 in which light-receiving elements are arranged.

The micro-lens array 321 may condense the received light or separate light received by pixels corresponding to the color filter array 322. Regarding the size of the basic unit of the micro-lenses of the micro-lens array 321, a specific multiple of the size of the light-receiving elements of the light-receiving element array 323 may be used as the basic unit. The aspect ratio of the basic unit of the micro-lenses of the micro-lens array 321 may be different from the aspect ratio of the light-receiving elements. The specific multiple of the basic unit of the micro-lenses may be Identical to the specific multiple of the basic unit of the color filters of the color filter array 322. For example, regarding the basic unit of the micro-lenses, a size corresponding to two pixels of the light-receiving elements in the horizontal direction may be used as the basic unit.

The color filter array 322 may implement a color by selectively passing a wavelength of received light. Regarding the basic unit of the color filters of the color filter array 322, a specific multiple of the size of the light-receiving elements of the light-receiving element array 323 may be used as the basic unit, and each color filter may include different colors (e.g., R (red), G (green), B (blue)). In addition, the summed wavelength region of different colors may include all wavelength regions of visible light. The size of the basic unit of the color filters of the color filter array 322 may have the same aspect ratio.

The color filter array 322 may form various patterns (e.g., a specific pattern). For example, the color filter array 322 may include a color filter array with an RGB pattern, an RGBE (red, green, blue, emerald) pattern, a CYYM (cyan, yellow, magenta) pattern, a CYGM (cyan, yellow, green, magenta) pattern, or a RGBW (red, green, blue, white) pattern.

The light-receiving element array 323 may receive light and convert the light into an electrical signal.

The lengths of the light-receiving element array 323 in the horizontal direction and the vertical direction perpendicular to the horizontal direction may be different from each other. For example, in the light-receiving element array 323, the length of the vertical direction may be 1.5 times the length of the horizontal direction. The horizontal direction of the light-receiving element array 323 may indicate the direction in which read-out of an image sensor (e.g., the image sensor 230 in FIG. 2) is performed.

The micro-lens array 321, the color filter array 322, and the light-receiving element array 323 of the camera module 320 may have a stacked structure. For example, the color filter array 322 may be disposed on the light-receiving element array 323, and the micro-lens array 321 may be disposed on the color filter array 322.

The incident light entering the camera module 320 may sequentially pass through the micro-lens array 321, the color filter array 322, and the light-receiving element array 323. For example, the micro-lens array 321 may pass the incident light, and the color filter array 322 may selectively pass a wavelength of the incident light. In addition, the light-receiving element array 323 may convert the light that has been selectively passed by the color filter array 322 into an electrical signal.

The processor 310 may perform data calculation (e.g., calculation of a pixel value) based on an electrical signal for the light that has sequentially passed through the micro-lens array 321, the color filter array 322, and the light-receiving element array 323.

The electronic device 300 may include an image signal processor (ISP) (e.g., the image signal processor 260 in FIG. 2). For example, the image signal processor may be included in the camera module 320 or included in a component other than the camera module 320.

The image signal processor may perform data calculation on the incident light under the control of the processor 310. For example, the image signal processor may perform data calculation (e.g., the calculation of a pixel value) on the light that has sequentially passed through the micro-lens array 321, the color filter array 322, and the light-receiving element array 323. For example, the image signal processor may calculate (e.g., sum) pixel values in units of color filters included in the color filter array 322 (e.g., the color filter 621, the color filter 622, the color filter 623, and the color filter 624 in FIG. 6) for conversion into a Bayer pattern. According to another embodiment, data calculation for pixel values may be performed in units of effective pixels (e.g., effective pixels (e.g., an effective pixel 710, an effective pixel 720, and an effective pixel 730) in FIG. 7), rather than the configuration (e.g., the number) of the micro-lens array 321 and the light-receiving element array 323.

The memory 330 may be electrically connected to the processor 310, and the processor 310 may store processed data in the memory 330. In addition, the memory 330 may be a volatile memory or a nonvolatile memory.

The display 340 may be electrically connected to the processor 310, and the processor 310 may display a screen on the display 340 based on the processed data.

Figure 4:
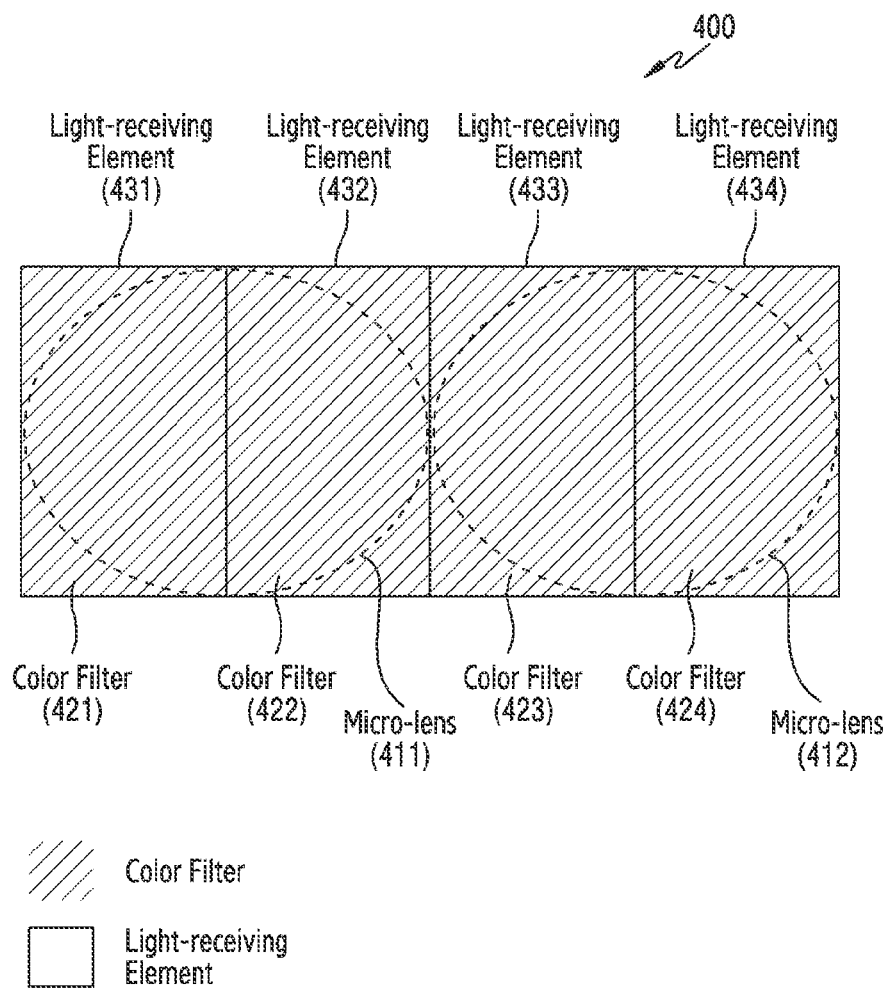
FIG. 4 illustrates a structure of a micro-lens array, a color filter array, and a light-receiving element array according to an embodiment.

FIG. 4 illustrates a structure of a micro-lens array, a color filter array, and a light-receiving element array according to an embodiment.

The structure illustrated in FIG. 4 represents a part 400 of a structure obtained when the stacked structure of the micro-lens array, the color filter array, and the light-receiving element array is viewed from the top. For example, FIG. 4 illustrates a structure including four light-receiving elements (e.g., the light-receiving element 431, the light-receiving element 432, the light-receiving element 433, and the light receiving element 434), four color filters (e.g., the color filter 421, the color filter 422, the color filter 423, and the color filter 424), and two micro-lenses (e.g., the micro-lens 411 and the micro-lens 412) among the stacked structures of the micro lens array, a color filter array and a light receiving elements array when viewed from the top.

A pattern of the part 400 of the structures obtained when the stacked structure of the micro-lens array, the color filter array, and the light-receiving element array is viewed from the top may be repeated in the entire structure obtained when the stacked structure is viewed from the top.

The micro-lens 411 and the micro-lens 412 may be disposed adjacent to each other. For example, the micro-lens 411 may be disposed in a region that covers the color filter 421 and the color filter 422, and the micro-lens 412 may be disposed in a region that covers the color filter 423 and the color filter 424. The micro-lens 411 and the micro-lens 412 are disposed adjacent to each other while covering four color filters (e.g., the color filter 421, the color filter 422, the color filter 423, and the color filter 424). As another example, the micro-lens 411 may be disposed in a region that covers the light-receiving element 431 and the light-receiving element 432, and the micro-lens 412 may be disposed in a region that covers the light-receiving element 433 and the light-receiving element 434. The micro-lens 411 and the micro-lens 412 may be disposed adjacent to each other while covering four light-receiving elements (e.g., the light-receiving element 431, the light-receiving element 432, the light-receiving element 433, and the light-receiving element 434).

In an embodiment, four color filters (e.g., the color filter 421, the color filter 422, the color filter 423, and the color filter 424) may be arranged side by side in the same row. In addition, the color filter 421, the color filter 422, the color filter 423, and the color filter 424 may be disposed under the micro-lens 411 and the micro-lens 412. As a specific example, the first row of the color filter array 322 corresponding to the first row of the micro-lens array may include the color filter 421 and the color filter 422 disposed under the micro-lens 411 and the color filter 423 and the color filter 424 disposed under the micro-lens 412. For example, in the first row of the color filter array 322 corresponding to the first row of the micro-lens array, under the micro-lens 411, the color filter 421 may be disposed in the first column, the color filter 422 may be disposed in the second column, the color filter 423 may be disposed in the third column, and the color filter 424 may be disposed in the fourth column.

The light-receiving element 431, the light-receiving element 432, the light-receiving element 433, and the light-receiving element 434 may be disposed under the color filter 421, the color filter 422, the color filter 423, and the color filter 424, respectively. For example, the light-receiving element 431 may be disposed under the color filter 421, the light-receiving element 432 may be disposed under the color filter 422, the light-receiving element 433 may be disposed under the color filter 423, and the light-receiving element 434 may be disposed under the color filter 424.

Figure 5:
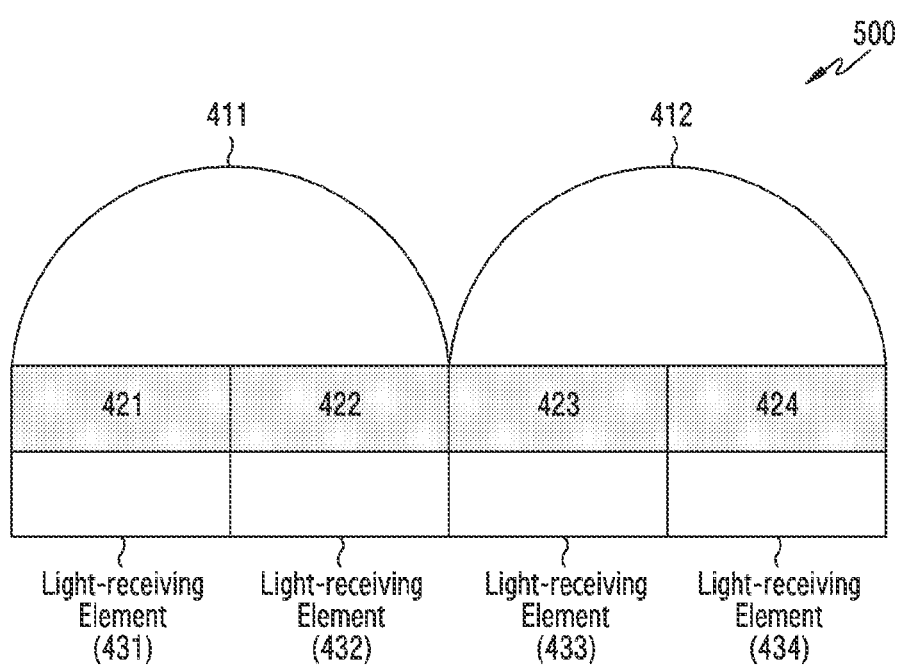
FIG. 5 illustrates a structure of a micro-lens array, a color filter array, and a light-receiving element array according to an embodiment.

FIG. 5 illustrates a structure of a micro-lens array, a color filter array, and a light-receiving element array according to an embodiment.

The structure illustrated in FIG. 5 is a part 500 of a structure obtained when a stacked structure of a micro-lens array, a color filter array, and a light-receiving element array (e.g., the light-receiving element array 323 in FIG. 3) is viewed from a lateral side.

The pattern of the part 400 of the structure obtained when the stacked structure of the micro-lens array, the color filter array, and the light-receiving element array 323 is viewed from a lateral side may be repeated in the entire structure obtained when the stacked structure is viewed from the top.

The color filter 421 and the color filter 422 may be disposed under the micro-lens 411, and the color filter 423 and the color filter 424 may be disposed under the micro-lens 412.

The light-receiving element 431 and the light-receiving element 432 may be disposed under the color filter 421 and the color filter 422, respectively, and the light-receiving element 433 and the light-receiving element 434 may be disposed under the color filter 423 and the color filter 424, respectively. For example, the light-receiving element 431 may be disposed under the color filter 421, the light-receiving element 432 may be disposed under the color filter 422, the light-receiving element 433 may be disposed under the color filter 423, and the light-receiving element 434 may be disposed under the color filter 424. In the first row of the light-receiving element 323 corresponding to the first row of the color filter array 322, the light-receiving element 431 disposed under the color filter 421 may be included in the first column, the light-receiving element 432 disposed under the color filter 422 may be included in the second column, the light receiving element 433 disposed under the color filter 423 may be included in the third column, and the light-receiving element 434 disposed under the color filter 424 may be included in the fourth column.

The color filter 421, the color filter 422, the color filter 423, and the color filter 424 may correspond to one color filter having the same color.

Figure 6:
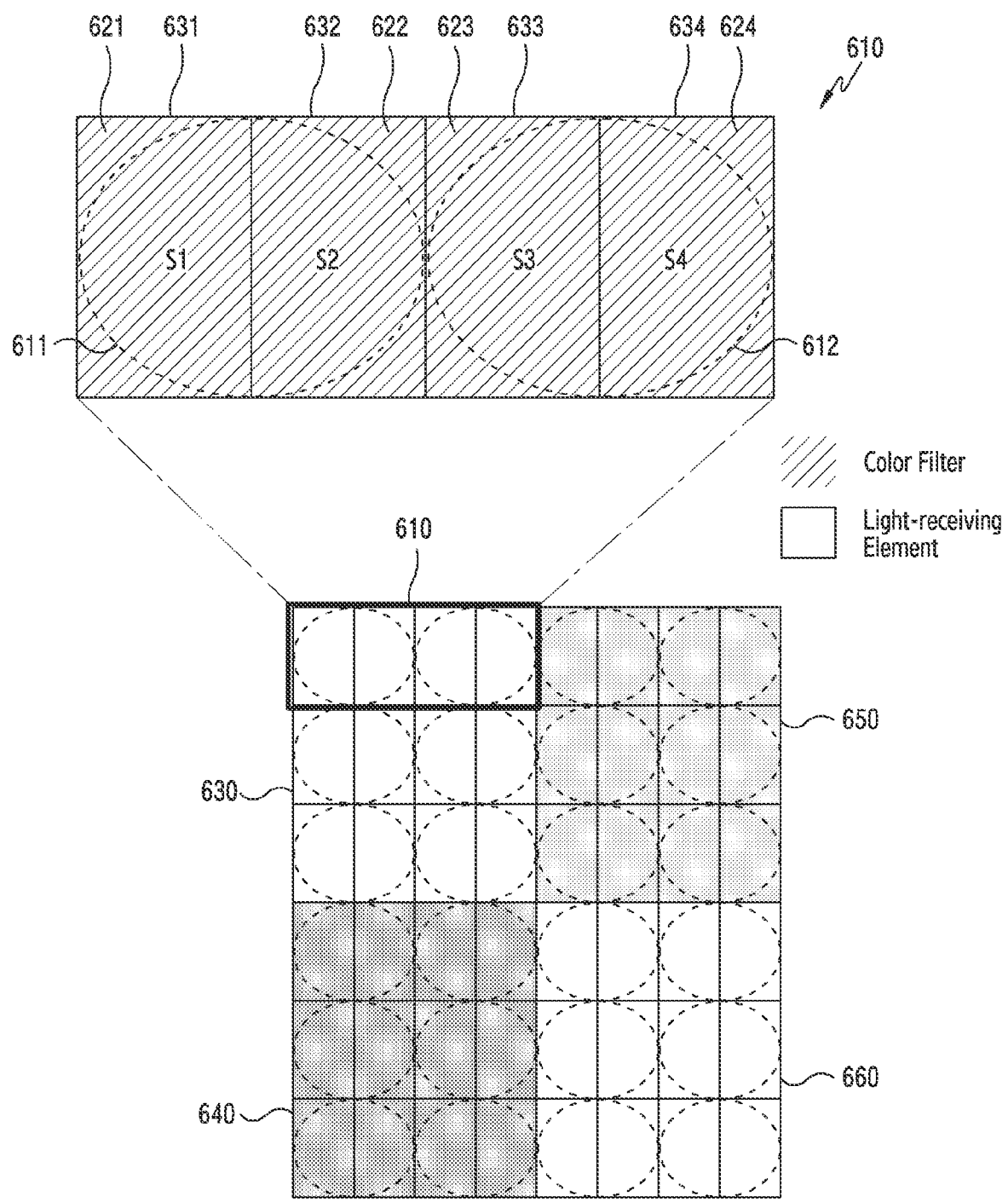
FIG. 6 illustrates a structure of a micro-lens array, a color filter array, and a light-receiving element array according to an embodiment.

FIG. 6 illustrates a structure of a micro-lens array, a color filter array, and a light-receiving element array according to an embodiment.

That is, FIG. 6 illustrates a structure obtained when viewing from above a stacked structure of a micro-lens array, a color filter array, and a light-receiving element array.

A region 610 may include four light-receiving elements 631, 632, 633 and 634, four color filters 621, 622, 623 and 624, and two micro-lenses 611 and 612. For example, the region 610 may be a region corresponding to the first to fourth columns in the first row of the color filter array.

In the region 610, the first to fourth columns of the first row of the color filter array corresponding to the first to fourth columns of the first row of the micro-lens array may include the color filter 621 and the color filter 622 disposed under the micro-lens 611 and the color filter 623 and the color filter 624 disposed under the micro-lens 612. The first to fourth columns of the first row of the color filter array may include the light-receiving element 631, the light-receiving element 632, the light-receiving element 633, and the light-receiving element 634, which are disposed under the color filter 621, the color filter 622, the color filter 623, and the color filter 624, respectively.

In the region 610, the light-receiving element 631 disposed under the color filter 621, the light-receiving element 632 disposed under the color filter 622, the light-receiving element 633 disposed under the color filter 623, and the light-receiving element 634 disposed under the color filter 624 may be included in the first to fourth columns of the first row of the light-receiving element array 323 corresponding to the first to the fourth columns of the first row of the color filter array. The light-receiving elements 431 to 434 may be formed to have different horizontal (row) and vertical (column) sizes. For example, the light-receiving elements may have a size of about 0.8 μm (column)×about 0.6 μm (row). In addition, the micro-lenses may be formed in a size of about 0.8 μm (column)×about 1.2 μm (row), and two light receiving lenses may be configured per one micro-lens.

In the region 610, the electronic device 300 may acquire data required for calculation of a pixel value based on an electrical signal from a light-receiving element under the control of the processor 310. For example, under the control of the processor 310, the electronic device 300 may acquire data S1 from a first light-receiving element disposed under the color filter 621 and may acquire data S2 from a second light-receiving element disposed under the color filter 622. In addition, under the control of the processor 310, the electronic device 300 may acquire data S3 from a third light-receiving element disposed under the color filter 623 and may acquire data S4 from a fourth light-receiving element disposed under the color filter 624.

The colors of the color filters 621 to 624 may be the same or may correspond to one color filter region having one color.

A region 630 may correspond to the first to fourth columns in the first to third rows of a color filter array or a light-receiving element array.

The region 630 may include a structure in which a structure of the region 610 corresponding to the first to fourth columns in the first row of a color filter array is also repeatedly arranged in the same manner in the first to fourth columns in the second and third rows located next to the first row of a color filter array.

The colors of the color filters included in the region 630 may be the same, such as G (green).

A region 640 may correspond to the first to fourth columns in the fourth to sixth rows of a color filter array.

A region 650 may correspond to the fifth to eighth columns in the first to third rows of a color filter array.

A region 660 may correspond to the fifth to eighth columns in the fourth to sixth rows of a color filter array.

The region 640, the region 650, and the region 660 may be disposed around the region 630. For example, the region 640 and the region 650 may be disposed adjacent to the region 630, and the region 660 may be disposed adjacent to the region 640 and the region 650.

Each of the region 630, the region 640, the region 650, and the region 660 may be considered as one group. For example, the region 630 may be considered as a first group, the region 640 may be considered as a second group, the region 650 may be considered as a third group, and the region 660 may be considered as a fourth group. In addition, assuming that a color filter array and a light-receiving element array include the above groups, it may be considered that the first group is arranged in the first column of the first row, the second group is arranged in the second column of the first row, the third group is arranged in the first column of the second row, and the fourth group is arranged in the second column of the second row.

The colors of the color filters included in region 640 may be different from colors of the color filters included in region 630, 650, and 660. For example, the colors of the color filters included in the region 640 may be the same as B (blue).

The colors of the color filters included in region 650 may be different from colors of the color filters included in region 630, 640, and 660. For example, the colors of the color filters included in the region 650 may be the same as R (red).

The colors of the color filters included in region 660 may be the same as the colors of the color filters included in the region 630 and may be different from the colors of the color filters included in region 630, 640, and 650. For example, the colors of the color filters included in the region 660 may be the same as G (green).

A pattern configured with the region 630, the region 640, the region 650, and the region 660 may be repeated in the color filter array. For example, in the color filter array 322, a pattern configured with the region 630 including color filters having the color G, the region 640 including color filters having the color B, the region 650 including color filters having the color R, and the region 660 including color filters having the color G may be repeated.

The electronic device generates color data required for image output based on effective pixels under the control of the processor. For example, there may be one pattern configured with the regions 630 to 660. In this case, the electronic device 300 may generate color data regarding the region 630 or the region 660 required for image output based on effective pixels corresponding to the color G (e.g., effective pixels of a 3×3 arrangement). In addition, the electronic device 300 may generate color data regarding the region 640 required for image output based on effective pixels corresponding to the color B (e.g., effective pixels of a 3×3 arrangement) and may generate color data regarding the region 650 required for image output based on effective pixels corresponding to the color R (e.g., effective pixels of a 3×3 arrangement).

An electronic device may generate AF data required for AF under the control of a processor. For example, the electronic device 300 may generate AF data under the control of the processor 310 based on a structure in which two light-receiving elements correspond to one micro-lens 611. In addition, the electronic device 300 may generate AF data for all pixels of a color filter array or a light-receiving element array 323.

An electronic device may sequentially output color data and AF data under the control of a processor.

Figure 7:
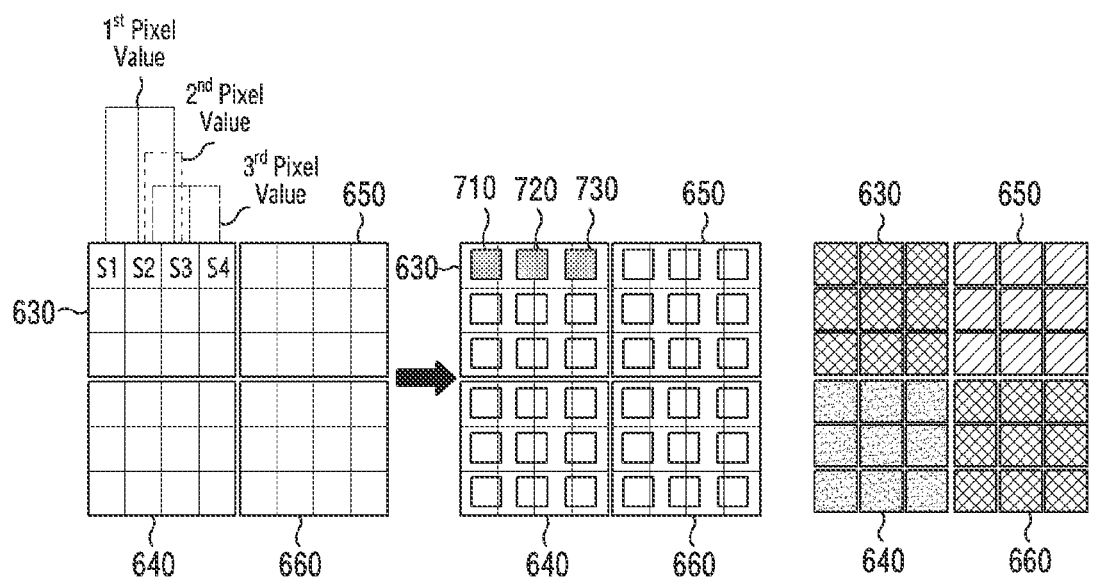
FIG. 7 illustrates a process of calculating pixel values according to structures of a micro-lens array, a color filter array, and a light-receiving element array in an electronic device according to an embodiment.

FIG. 7 illustrates a process of calculating pixel values according to structures of a micro-lens array, a color filter array, and a light-receiving element array in an electronic device according to an embodiment.

An electronic device may acquire data regarding light that has passed through a micro-lens array, a color filter array, and a light-receiving element array 323 under the control of a processor.

An electronic device may acquire data regarding light based on an electrical signal generated by photoelectric conversion of the light-receiving elements of a light-receiving element array 323 under the control of a processor 310.

An electronic device may acquire pixel values through weight calculation in consideration of the phase differences of pixels, the center of gravity of effective pixels, and the effective pixels under the control of a processor 310.

The effective pixels 710, 720, and 730 may be virtual pixel regions defined by a processor 310 of an electronic device 300 by calculating data (e.g., the data S1, the data S2, the data S3, and the data S4) corresponding to respective pixels. For example, the electronic device 300 may acquire the pixel values of the effective pixel 710, the effective pixel 720, and the effective pixel 730 by calculating the data S1, the data S2, the data S3, and the data S4 corresponding to respective pixels under the control of the processor 310.

An electronic device 300) may acquire the pixel values of 3×3 effective pixels corresponding to the region 630 under the control of a processor 310 in addition to those of the effective pixels such as the above-described effective pixel 710, effective pixel 720, and effective pixel 730. In addition, an electronic device (e.g., the electronic device 300) may acquire pixel values of 3×3 effective pixels corresponding to the regions 630 to 660 and/or pixel values of 3×3 effective pixels corresponding to all pixels of the electronic device 300 under the control of the processor 310.

The electronic device 300 may convert the above-described 3×3 effective pixels into 1×1 effective pixels under the control of the processor 310. An electronic device 300 may use binning in which a plurality of pixels are grouped into one pixel and processed. For example, nona-binning in which 3×3 effective pixels are integrated may be performed, and noise around a lens assembly 210 in a low-illuminance environment may be reduced. In addition, an electronic device 300 may differently perform respective processes regarding image data and AF data under the control of a processor when generating a high-resolution image and a low-resolution image, and details will be described later.

An electronic device may perform calculation for the data acquired from four pixels (e.g., the data S1, the data S2, the data S3, and the data S4) under the control of a processor. In addition, an electronic device may acquire respective pixel values (e.g., a first pixel value, a second pixel value, and a third pixel value) corresponding to effective pixels 710 to 730 under the control of a processor.

Referring to the first to fourth columns in the first row of the region 630 as an example, an electronic device may acquire data S1 from a light-receiving element corresponding to the first column of the first row (e.g., the first light-receiving element) under the control of a processor. An electronic device may acquire data S2 from a light-receiving element corresponding to the second column of the first row (e.g., the second light-receiving element) under the control of a processor. In addition, an electronic device may acquire data S3 from a light-receiving element corresponding to the third column of the first row (e.g., the third light-receiving element) and data S4 from a light-receiving element corresponding to the fourth column of the first row (e.g., the fourth light-receiving element) under the control of a processor.

An electronic device may acquire the first pixel value based on the data S1, the data S2, and the data S3 under the control of a processor. For example, the electronic device 300 may acquire the pixel value of the effective pixel 710 (e.g., the first pixel value) through weight calculation of $(\frac{2}{3} \times S1)+(\frac{1}{2} \times S2)+(-\frac{1}{6} \times S3)$ for the data S1, the data S2, and the data S3 under the control of the processor 310. As another example, the electronic device 300 may acquire the pixel value of the effective pixel 710 (e.g., the first pixel value) through weight calculation (e.g., the weight calculation of $(\frac{2}{3} \times S1)+(\frac{1}{2} \times S2)+(-\frac{1}{6} \times S3)$) for the data S1, the data S2, and the data S3 under the control of the processor 310 in terms of resolution improvement and artifact improvement as well.

An electronic device may acquire the second pixel value based on the data S2 and the data S3 under the control of a processor. For example, the electronic device 300 may perform weight calculation in consideration of the phase difference of pixels that share a micro-lens 611 (e.g., the pixels corresponding to the color filter 621 and the color filter 622). As an example, the pixels corresponding to the color filter 621 and the color filter 623 may have similar phases, and the pixels corresponding to the color filter 622 and the color filter 624 may also have similar phases. The electronic device 300 may acquire the pixel value of the effective pixel 720 (e.g., the second pixel value) through weight calculation of $(\frac{1}{2} \times S2)+(\frac{1}{2} \times S3)$ for the data S2 and the data S3 under the control of the processor 310. In terms of resolution enhancement, the electronic device 300 may acquire the pixel value of the effective pixel 720 (e.g., the second pixel value) through weight calculation of $(1 \times S1)+(-\frac{1}{2} \times S2)+(-\frac{1}{2} \times S4)+(1 \times S4)$ for the data S1, the data S2, the data S3, and the data S4 under the control of the processor 310. In terms of artifact improvement, the electronic device 300 may acquire the pixel value of the effective pixel 720 (e.g., the second pixel value) through weight calculation of $(\frac{1}{3} \times S1)+(\frac{1}{6} \times S2)+(\frac{1}{6} \times S3)+(\frac{1}{3} \times S4)$ for the data S1, the data S2, the data S3, and the data S4 under the control of the processor 310. An electronic device may acquire the third pixel value based on the data S2, the data S3, and the data S4 under the control of a processor. For example, the electronic device 300 may acquire the pixel value of the effective pixel 730 (e.g., the third pixel value) through weight calculation of $(-\frac{1}{6} \times S2)+(\frac{1}{2} \times S3)+(\frac{2}{3} \times S4)$ for the data S2, the data S3, and the data S4 under the control of the processor 310. In addition, in terms of resolution enhancement and artifact improvement, the electronic device 300 may acquire the pixel value of the effective pixel 730 (e.g., the third pixel value) through weight calculation of (−⅙× S2)+(½×S3)+(⅔×S3) for the data S2, the data S3, and the data S4 under the control of the processor 310.

As described above, based on a user input or input data, the electronic device 300 may differently perform an effective pixel data process of artifact, focusing on resolution improvement, under the control of the processor 310.

An electronic device may generate color data required for image output based on acquired pixel values (e.g., the first pixel value, the second pixel data, and the third pixel data) under the control of a processor.

An electronic device 300 may differently perform processes regarding image data and AF data under the control of a processor when generating a high-resolution image and a low-resolution image.

In the case of generating a high-resolution image, the electronic device 300 may acquire by interpolating image information (e.g., information corresponding to nine light-receiving elements) more than the number (e.g., six) of light-receiving elements under the control of the processor 310. In addition, the electronic device 300 may acquire a phase difference signal (e.g., PDAF data) required for AF from two or more light-receiving elements among the light-receiving elements (e.g., six light-receiving elements) under the control of the processor 310.

In generating a low-resolution image, the electronic device 300 may perform a binning process on the six light-receiving elements under the control of the processor 310 and receives one piece of color data. In addition, the electronic device 300 may acquire a phase difference signal (e.g., PDAF data) required for AF from two or more light-receiving elements among the light-receiving elements (e.g., six light-receiving elements) under the control of the processor 310. In generating high-resolution and low-resolution images, the electronic device 300 may sequentially acquire processed image-related data and AF data under the control of the processor 310.

The electronic device 300 may control activation and/or deactivation of an AF-related operation under the control of the processor 310.

Pixel groups which independently generate electrical signals (e.g., pixel signals) and in which a plurality of pixels are disposed in an x (or horizontal) direction or a y (or vertical) direction perpendicular to each other may be defined as a first pixel group (e.g., the left side of FIG. 7) located under a single micro-lens and a (square) second pixel group (e.g., the right side of FIG. 7) located under a color filter having a single color.

The length in the x direction of the first pixel group may be longer than the length in the y direction. For example, the length of the first pixel group in the x direction may be 1.2 μm, and the length in they direction may be 0.8 μm. However, this is an example, and the disclosure is not limited thereto.

The number of pixels in the x direction of the first pixel group may be greater than the number of pixels in the y direction. For example, the number of pixels in the x direction may be twice the number of pixels in the y direction. However, this is an example, and the disclosure is not limited thereto.

The first pixel group may be arranged in the x direction and y direction the region of the first pixel group may be arranged to substantially coincide with the region of the second pixel group.

In data calculation, from a second pixel signal inside the region of the second pixel group, a processor 310 of an electronic device 300 may generate a third pixel signal of the same region. For example, in generating the third pixel signal, the processor 310 of the electronic device 300 may generate pixel signals less than the number of the pixels in the second pixel group region by combining pixel signals of a plurality of adjacent different first pixel groups. In this case, the processor 310 of the electronic device 300 may perform combining only with pixel signals arranged in the x direction. However, the disclosure is not limited thereto.

The electronic device 300 may generate PDAF data based on a signal of the first pixel group under the control of the processor 310.

An electronic device 300 may maintain an aspect ratio of effective pixel data under the control of a processor 310.

In a light-receiving element array 323 of the electronic device 300, the horizontal and vertical lengths may be the same at an aspect ratio of 3×4, and the pixel values acquired by the electronic device 300 may be according to an aspect ratio of 3×3 in the same horizontal and vertical lengths. The electronic device 300 may acquire image data corresponding to a specific arrangement (e.g., 3×3) by performing a data process on the light-receiving elements of another arrangement (e.g., 3×4).

An electronic device may generate color data required for image output based on the pixel values (e.g., the first pixel value, the second pixel value, and the third pixel value) acquired under the control of a processor. The electronic device 300 may perform a re-mosaic process on a nona-type pixel pattern under the control of the processor 310 to output the pixel pattern as a Bayer pattern. In an embodiment, under the control of the processor 310, the electronic device 300 may acquire the first pixel value, the second pixel value, and the third pixel valve corresponding to the first to fourth columns of the first row in the region 630, as described above. The electronic device 300 may acquire pixels values corresponding to the first to four columns of the second and third rows of the region 630 (e.g., the fourth to ninth pixel values) under the control of the processor 310 in the same manner. The electronic device 300 may acquire pixel values corresponding to the region 640, the region 650, and the region 660 in the same manner as the region 630 under the control of the processor 310. The electronic device 300 may acquire total pixel values of each of the region 630, the region 640, the region 650, and the region 660. The electronic device 300 may output the total pixel values of each of the regions 630, 640, 650, and 660 as a Bayer pattern.

According to an embodiment, an electronic device may include a camera module and at least one processor electrically connected to the camera module, wherein the camera module may include a micro-lens array including a plurality of micro-lenses, a color filter array disposed under the micro-lens and including a plurality of color filters, a light-receiving element array disposed under the color filter array and including a plurality of light-receiving elements, wherein a first row of the micro-lens array may include a first micro-lens and a second micro-lens adjacent to the first micro-lens, wherein a first row of the color filter array corresponding to the first row of the micro-lens array may include a first color filter and a second color filter disposed under the first micro-lens, and a third color filter and the fourth color filter disposed under the second micro-lens, and wherein a first row of the light-receiving element array corresponding to the first row of the color filter array may include a first light-receiving element disposed under the first color filter, a second light-receiving element disposed under the second color filter, a third light-receiving element disposed under the third color filter, and a fourth light-receiving element disposed under the fourth color filter.

In the electronic device the at least one processor (may be configured to acquire a first pixel value based on first data acquired by the first light-receiving element, second data acquired by the second light-receiving element, and third data acquired by the third light-receiving element, to acquire a second pixel value based on the second data and the third data, and to acquire a third pixel value based on the second data, the third data, and fourth data acquired by the fourth light-receiving element.

In the electronic device, the at least one processor may be configured to acquire the first pixel value by applying different weights to the first data, the second data, and the third data, respectively.

In the electronic device, the at least one processor may be configured to acquire the second pixel value by applying the same weight to each of the second data and the third data.

In the electronic device, the at least one processor may be configured to acquire the third pixel value by applying different weights to the second data, the third data, and the fourth data, respectively.

In the electronic device, the at least one processor may be configured to generate AF data based on the first light-receiving element, the second light-receiving element, the third light-receiving element, and the fourth light-receiving element.

In the electronic device, the at least one processor) may be configured to generate color data based on the first pixel value, the second pixel value, and the third pixel value, and to sequentially output the color data and the AF data.

In the electronic device, the processor may be configured to acquire a first pixel value, a second pixel value, and a third pixel value based on the first data acquire by the first light-receiving element, the second data acquired by the second light-receiving element\, the third data acquired by the third light-receiving element, and the fourth data acquired by the fourth light-receiving element.

In the electronic device, the first color filter, the second color filter, and the third color filter, and the fourth color filter of the color filter array may have a first color, and color filters disposed in the same column as any one of the first color filter, the second color filter, the third color filter, and the fourth color filter of a second row and a third row located next to the first row of the color filter array may include a first group having a first color.

The electronic device may include a second group including the same number of color filters as the first group is included, wherein the color filters of the second group have a second color, may a third group including the same number of color filters as the first group, wherein the color filters of the third group have a third color, and the first group, the second group, and the third group may form a specific pattern.

According to an embodiment, a camera module may include an image signal processor, a micro-lens array including a plurality of micro-lenses, a color filter array disposed under the micro-lens and including a plurality of color filters, a light-receiving element array disposed below the color filter array and including a plurality of light-receiving elements, wherein a first row of the micro-lens array (may include a first micro-lens and a second micro-lens adjacent to the first micro-lens, wherein a first row of the color filter array corresponding to the first row of the micro-lens array may include a first color filter and a second color filter disposed below the first micro-lens, and a third color filter and the fourth color filter disposed under the second micro-lens, and wherein a first row of the light-receiving element array corresponding to the first row of the color filter array may include a first light-receiving element disposed under the first color filter, a second light-receiving element disposed under the second color filter, a third light-receiving element disposed under the third color filter, and a fourth light-receiving element disposed under the fourth color filter.

In the camera module, the image signal processor may be configured to acquire a first pixel value based on first data acquired by the first light-receiving element, second data acquired by the second light-receiving element, and third data acquired by the third light-receiving element, to acquire a second pixel value based on the second data and the third data, and to acquire a third pixel value based on the second data, the third data, and fourth data acquired by the fourth light-receiving element.

The image signal processor may be configured to acquire the first pixel value by applying different weights to the first data, the second data, and the third data, respectively.

The image signal processor may also be configured to acquire the second pixel value by applying the same weight to each of the second data and the third data.

The image signal processor may be configured to acquire the third pixel value by applying different weights to the second data, the third data, and the fourth data, respectively.

According to an embodiment, an electronic device may include a camera module (and a processor operatively connected to the camera module, wherein the camera module may include a micro-lens array a color filter array including a plurality of color filters, wherein each of the plurality of color filters may selectively path a wavelength of incident light, which passes through the micro-lens array, and a light-receiving element array disposed under the color filter array, wherein the micro-lens array may be arranged in an N/2×M array, the color filter array may be arranged in an N×M array, and the light-receiving element array may be arranged in an N×M array.

The processor may be configured to acquire first data, second data, third data, and fourth data based on an electrical signal photoelectrically converted by the light-receiving element array.

The processor may be configured to acquire a first pixel value based on the first data, the second data, and the third data, to acquire a second pixel value based on the second data and the third data, and to acquire a third pixel value based on the second data, the third data, and the fourth data.

The processor may be configured to acquire the first pixel value by applying different weights to the first data, the second data, and the third data, respectively, to acquire the second pixel value by applying a same weight to each of the second data and the third data, and to acquire the third pixel value by applying different weights to the second data, the third data, and the fourth data, respectively.

The processor may be configured to maintain and output an aspect ratio of effective pixel data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
a camera module; and
at least one processor electrically connected to the camera module,
wherein the camera module includes:
a micro-lens array including a plurality of micro-lenses,
a color filter array disposed under the micro-lens array and including a plurality of color filters, and
a light-receiving element array disposed under the color filter array and including a plurality of light-receiving elements,
wherein a first row of the micro-lens array includes a first micro-lens and a second micro-lens adjacent to the first micro-lens,
wherein a first row of the color filter array corresponding to the first row of the micro-lens array includes a first color filter and a second color filter disposed under the first micro-lens, and a third color filter and a fourth color filter disposed under the second micro-lens,
wherein a first row of the light-receiving element array corresponding to the first row of the color filter array includes a first light-receiving element disposed under the first color filter, a second light-receiving element disposed under the second color filter, a third light-receiving element disposed under the third color filter, and a fourth light-receiving element disposed under the fourth color filter,
wherein the at least one processor is configured to obtain image data based on a first pixel value, a second pixel value and a third pixel value, and
wherein the first pixel value, the second pixel value and the third pixel value are obtained from first data acquired by the first light-receiving element, second data acquired by the second light-receiving element, third data acquired by the third light-receiving element, and fourth data acquired by the fourth light-receiving element.

2. The electronic device of claim 1, wherein the at least one processor is configured to:
acquire the first pixel value based on the first data, the second data, and the third data,
acquire the second pixel value based on the second data and the third data, and
acquire the third pixel value based on the second data, the third data, and the fourth data.

3. The electronic device of claim 2, wherein the at least one processor is further configured to acquire the first pixel value by applying different weights to the first data, the second data, and the third data, respectively.

4. The electronic device of claim 2, wherein the at least one processor is further configured to acquire the second pixel value by applying a same weight to each of the second data and the third data.

5. The electronic device of claim 2, wherein the at least one processor is further configured to acquire the third pixel value by applying different weights to the second data, the third data, and the fourth data, respectively.

6. The electronic device of claim 2, wherein the at least one processor is further configured to generate auto-focusing (AF) data based on the first light-receiving element, the second light-receiving element, the third light-receiving element, and the fourth light-receiving element.

7. The electronic device of claim 6, wherein the at least one processor is further configured to:
generate color data based on the first pixel value, the second pixel value, and the third pixel value, and
sequentially output the color data and the AF data.

8. The electronic device of claim 1, wherein the first color filter, the second color filter, the third color filter, and the fourth color filter of the color filter array have a first color, and
wherein color filters disposed in a column that is identical to any one of the first color filter, the second color filter, the third color filter, and the fourth color filter of a second row and a third row located next to the first row of the color filter array include a first group having a first color.

9. The electronic device of claim 8, wherein a second group including a same number of color filters as the first group is included, the color filters of the second group having a second color,
wherein a third group including a same number of color filters as the first group is included, wherein the color filters of the third group have a third color, and
wherein the first group, the second group, and the third group form a specific pattern.

10. A camera module, comprising:
an image signal processor;
a micro-lens array including a plurality of micro-lenses;
a color filter array disposed under the micro-lens array and including a plurality of color filters; and
a light-receiving element array disposed under the color filter array and including a plurality of light-receiving elements,
wherein a first row of the micro-lens array includes a first micro-lens and a second micro-lens adjacent to the first micro-lens,
wherein a first row of the color filter array corresponding to the first row of the micro-lens array includes a first color filter and a second color filter disposed under the first micro-lens, and a third color filter and a fourth color filter disposed under the second micro-lens,
wherein a first row of the light-receiving element array corresponding to the first row of the color filter array includes a first light-receiving element disposed under the first color filter, a second light-receiving element disposed under the second color filter, a third light-receiving element disposed under the third color filter, and a fourth light-receiving element disposed under the fourth color filter, and
wherein the image signal processor is configured to acquire a first pixel value, a second pixel value, and a third pixel value based on first data acquired by the first light-receiving element, second data acquired by the second light-receiving element, third data acquired by the third light-receiving element, and fourth data acquired by the fourth light-receiving element.

11. The camera module of claim 10, wherein the image signal processor is configured to:
acquire the first pixel value based on the first data, the second data, and the third data,
acquire the second pixel value based on the second data and the third data, and
acquire the third pixel value based on the second data, the third data, and the fourth data.

12. The camera module of claim 11, wherein the image signal processor is further configured to acquire the first pixel value by applying different weights to the first data, the second data, and the third data, respectively.

13. The camera module of claim 11, wherein the image signal processor is further configured to acquire the second pixel value by applying a same weight to each of the second data and the third data.

14. The camera module of claim 11, wherein the image signal processor is further configured to acquire the third pixel value by applying different weights to the second data, the third data, and the fourth data, respectively.

15. An electronic device, comprising:
a camera module; and
a processor operatively connected to the camera module,
wherein the camera module includes:
a micro-lens array;
a color filter array including a plurality of color filters, wherein each of the plurality of color filters selectively passes a wavelength of incident light, which passes through the micro-lens array, and
a light-receiving element array disposed below the color filter array,
wherein the micro-lens array is arranged in an N/2×M array, the color filter array is arranged in an N×M array, and the light-receiving element array is arranged in an N×M array, wherein M is larger than N, and
wherein the processor is configured to obtain pixel values of an M×M pixel array from the light-receiving element array arranged in the N×M array by obtaining M pixels from data acquired by N light-receiving elements in a row.

16. The electronic device of claim 15, wherein the processor is further configured to acquire first data, second data, third data, and fourth data based on an electrical signal photoelectrically converted by the light-receiving element array.

17. The electronic device of claim 16, wherein the processor is further configured to:
acquire a first pixel value based on the first data, the second data, and the third data,
acquire a second pixel value based on the second data and the third data, and
acquire a third pixel value based on the second data, the third data, and the fourth data.

18. The electronic device of claim 17, wherein the processor is configured to:
  acquire the first pixel value by applying different weights to the first data, the second data, and the third data, respectively,
  acquire the second pixel value by applying a same weight to each of the second data and the third data, and
  acquire the third pixel value by applying different weights to the second data, the third data, and the fourth data, respectively.

19. The electronic device of claim 15, wherein the processor is further configured to maintain and output an aspect ratio of effective pixel data.

* * * * *